US007606214B1

(12) United States Patent
Chandra Sekhar et al.

(10) Patent No.: US 7,606,214 B1
(45) Date of Patent: Oct. 20, 2009

(54) ANTI-SPAM IMPLEMENTATIONS IN A ROUTER AT THE NETWORK LAYER

(75) Inventors: Bharath Kumar Chandra Sekhar, Santa Clara, CA (US); Jianda Li, San Jose, CA (US); Shuosen Robert Liu, San Jose, CA (US); Narasimham Kodukula, Sunnyvale, CA (US)

(73) Assignee: Trend Micro Incorporated, Tokyo (JP)

( * ) Notice: Subject to any disclaimer, the term of this patent is extended or adjusted under 35 U.S.C. 154(b) by 484 days.

(21) Appl. No.: 11/521,893

(22) Filed: Sep. 14, 2006

(51) Int. Cl.
*H04L 12/28* (2006.01)
(52) U.S. Cl. .................... 370/351; 709/206; 726/22
(58) Field of Classification Search ............ None
See application file for complete search history.

(56) References Cited

U.S. PATENT DOCUMENTS

| | | | |
|---|---|---|---|
| 6,321,267 B1 * | 11/2001 | Donaldson | 709/229 |
| 6,654,787 B1 * | 11/2003 | Aronson et al. | 709/206 |
| 7,409,708 B2 * | 8/2008 | Goodman et al. | 726/13 |
| 2005/0193429 A1 * | 9/2005 | Demopoulos et al. | 726/23 |
| 2006/0031359 A1 * | 2/2006 | Clegg et al. | 709/206 |
| 2006/0031483 A1 * | 2/2006 | Lund et al. | 709/224 |
| 2006/0047769 A1 * | 3/2006 | Davis et al. | 709/207 |
| 2006/0126522 A1 * | 6/2006 | Oh | 370/250 |
| 2006/0168035 A1 * | 7/2006 | Cai et al. | 709/206 |
| 2006/0168041 A1 * | 7/2006 | Mishra et al. | 709/206 |
| 2006/0294588 A1 * | 12/2006 | Lahann et al. | 726/23 |
| 2008/0010353 A1 * | 1/2008 | Rounthwaite et al. | 709/206 |
| 2008/0016159 A1 * | 1/2008 | Cai | 709/206 |
| 2008/0016167 A1 * | 1/2008 | Lund et al. | 709/206 |
| 2008/0028029 A1 * | 1/2008 | Hart | 709/206 |
| 2008/0028467 A1 * | 1/2008 | Kommareddy et al. | 726/23 |
| 2008/0082662 A1 * | 4/2008 | Dandliker et al. | 709/225 |

OTHER PUBLICATIONS

Laura Chappell "Inside the TCP Hanshake" Novell Certified Professional, Mar. 2000, 2 pgs, NetWare Connection.
Banit Agrawal, et al. "Controlling Spam E-mail at the Routers" May 2005, pp. 1588-1592, vol. 3, Dept. of Computer Science & Engineering, University of California, Riverside, USA.
USA Today.com—Company introduces anti-spam router, lands $1M in financing, 2005 The Associated Press, 2 pgs [retrieved on Sep. 6, 2006]. Retrieved from the internet: http://usatoday/printhis.clickability.com/pt/cpt?action=cpt&title=USATODAY.com+-+Co.
Internet Protocols (IP), 1992-2005 Cisco Systems, Inc., pp. 1-15 [retrieved on Sep. 6, 2006]. Retrieved from the internet: http://www.cisco.com/univercd/cc/td/doc/cisintwk/ito_doc/ip.htm.
Trend Micro Products—Trend Micro Network Anti-Spam Service, 1989-2006, p. 1 of 1 [retrieved on Sep. 7, 2006]. Retrieved from the internet: http://www.trendmicro.com.au/enterprise/products/products.php?prodgroup=14&family=45&id=177&rightnav=0,0.
Trend Micro—Network Reputation Services, 1989-2006, 2 pgs [retrieved on Sep. 7, 2006]. Retrieved from the internet: http://www.trendmicro.com/en/products/nrs/overview.htm.

* cited by examiner

*Primary Examiner*—Phirin Sam
(74) *Attorney, Agent, or Firm*—Okamoto & Benedicto LLP

(57) ABSTRACT

In one embodiment, a router inspects at a network layer source addresses of network layer packets flowing through the router. The router compares the source addresses to addresses of computers employed by spammers, and performs a predetermined action on a particular network layer packet having a source address that belongs to a computer of a spammer. The predetermined action may involve dropping the particular network layer packet or limiting the data transfer rate of the particular network layer packet.

11 Claims, 5 Drawing Sheets

ANTI-SPAM IMPLEMENTATIONS IN A ROUTER AT THE NETWORK LAYER

BACKGROUND OF THE INVENTION

1. Field of the Invention

The present invention relates generally to data processing, and more particularly but not exclusively to techniques for combating spam.

2. Description of the Background Art

Electronic mail ("e-mail") has become a relatively common means of communication among individuals with access to a computer network, such as the Internet. Among its advantages, e-mail is relatively convenient, fast, and cost-effective compared to traditional mail. It is thus no surprise that a lot of businesses and home computer users have some form of e-mail access. Unfortunately, the features that make e-mail popular also lead to its abuse. Specifically, unscrupulous advertisers, also known as "spammers," have resorted to mass e-mailings of advertisements over the Internet. These mass e-mails, which are also referred to as "spam e-mails" or simply "spam," are sent to computer users regardless of whether they asked for them or not. Spam includes any unsolicited e-mail, not just advertisements. Spam is not only a nuisance, but also poses an economic burden.

Various anti-spam techniques have been developed to combat spam. In a content-level anti-spam, the content of each received e-mail is scanned for words, phrases, and other characteristics indicative of spam. Although content-level anti-spam has been proven effective, it doesn't do anything to reduce network traffic. This is primarily because an e-mail must be received by the anti-spam application at the destination network to be scanned in the first place. In connection-level anti-spam, the anti-spam application connects to a network reputation service (NRS) to check the reputation of the sender of the received e-mail. The network reputation service maintains a database of known spammers. The network reputation service compares the sender information of the received e-mail with those of known spammers to determine whether or not the received e-mail is spam. While connection-level anti-spam reduces network traffic to some extent, it still needs to accept a connection from a spammer, determine the reputation of the spammer, and then close the connection. Therefore, even in connection-level anti-spam, spammers still generate a substantial amount of network traffic.

SUMMARY

In one embodiment, a router inspects at a network layer source addresses of network layer packets flowing through the router. The router compares the source addresses to addresses of computers employed by spammers, and performs a predetermined action on a particular network layer packet having a source address that belongs to a computer of a spammer. The predetermined action may involve dropping the particular network layer packet or limiting the data transfer rate of the particular network layer packet.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
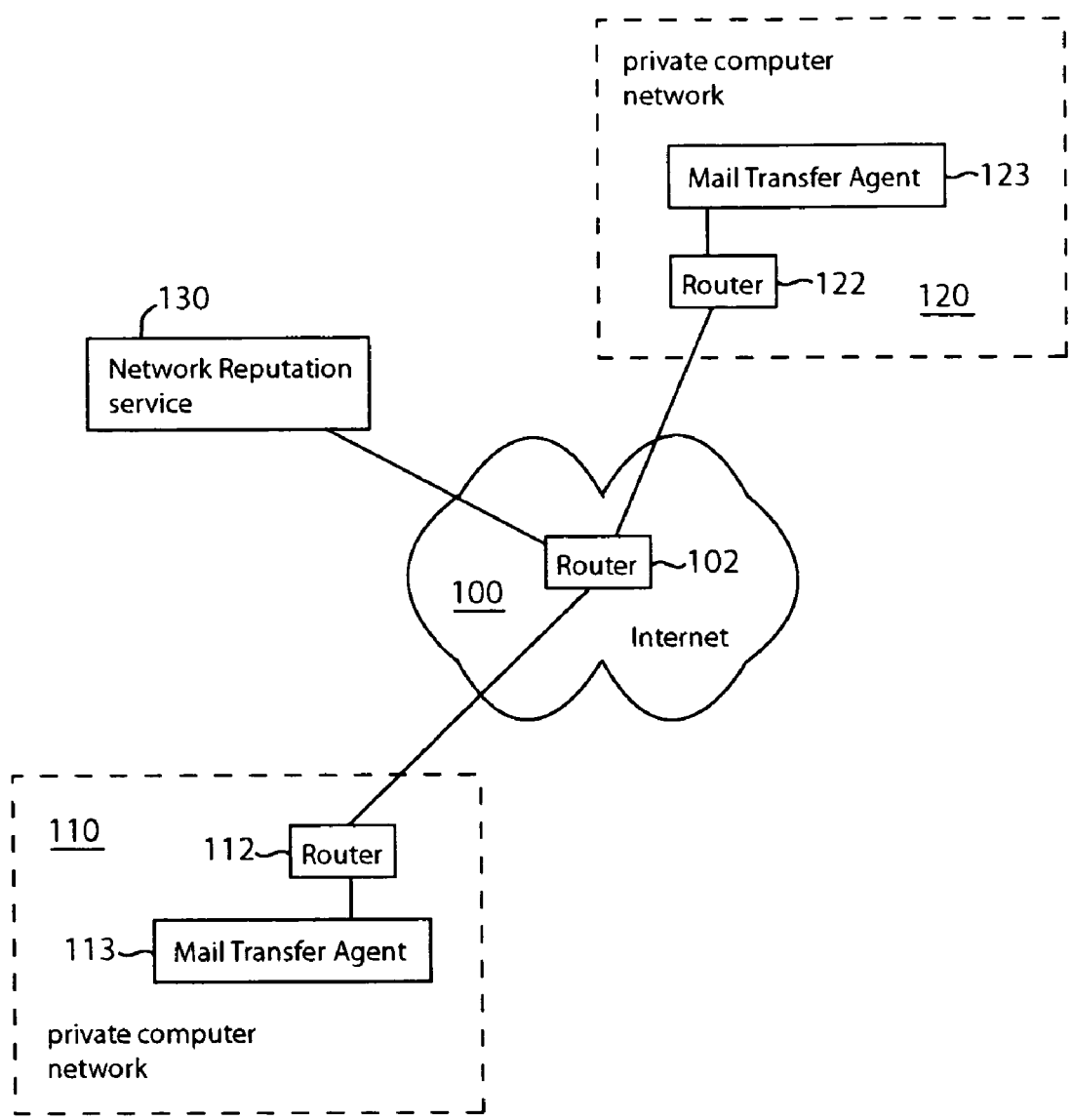
FIG. 1 schematically shows a computing environment in accordance with an embodiment of the present invention.

FIG. 1 schematically shows a computing environment in accordance with an embodiment of the present invention. The computing environment includes several private computer networks coupled over a public computer network 100, which includes the Internet. A private computer network may be an Internet service provider network, a corporate network, or other network that is not part of the Internet backbone and not generally available to the public. In the example of FIG. 1, the computing environment includes private computer networks 110 and 120. The private computer network 110 may include one or more mail transfer agents 113 and one or more routers 112. Similarly, the private computer network 120 may include one or more mail transfer agents 123 and one or more routers 122. The router 102 depicted as being part of the Internet backbone allows routing and delivery of packets between computers coupled to the Internet. As can be appreciated, there may be several interconnected routers in the private computer networks 110 and 120 as well as on the Internet. Only one router is shown for each for clarity of illustration.

Routers 112, 102, and 122 may comprise commercially available routers, such as those from Cisco Systems, Inc. As will be more apparent below, router 112 (or 102) may further include an anti-spam module 114 (see FIG. 2) in accordance with an embodiment of the present invention. Mail transfer agents 113 and 123 may comprise mail server computers for sending and receiving e-mails.

The computing environment of FIG. 1 also includes a network reputation service 130 coupled to the Internet. In one embodiment, the network reputation service 130 comprises a server computer that maintains a database of IP (Internet Protocol) addresses of known spammers. The network reputation service 130 may receive an IP address from the router 112 over the Internet and, in response, inform the router 112 whether the IP address belongs to a computer employed by a known spammer. An example network reputation service that may be employed in embodiments of the present invention includes the Trend Micro Network Reputation Service of Trend Micro, Inc.

Figure 2:
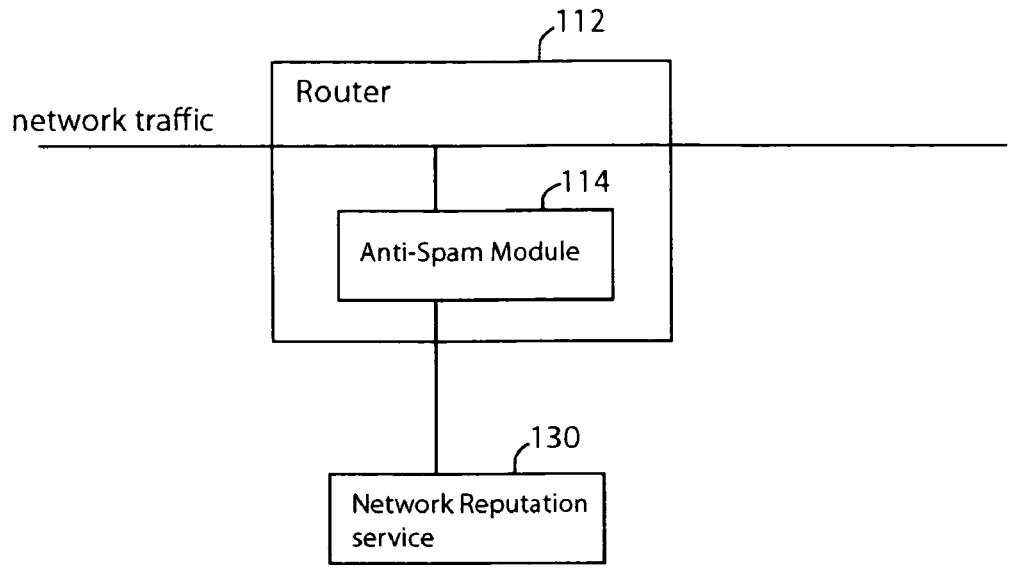
FIG. 2 schematically shows a router with an anti-spam module in accordance with an embodiment of the present invention.

As shown in FIG. 2, the router 112 may include an anti-spam module 114 in accordance with an embodiment of the present invention. The anti-spam module 114 may be configured to identify mail transfer agents of spammers. In one embodiment, the anti-spam module 114 is configured to tap into network traffic flowing through the router 112 to listen for packets that initiate a mail transfer connection (e.g., "TCP handshake" packets), get the reputation information of the computer initiating the connection, and store the reputation information locally in the router 112. The router 112 may consult the locally stored reputation information to identify spammers. The router 112 may perform a predetermined action on packets from computers of known spammers. The predetermined action may include blocking all subsequent packets from the computer or limiting the data transfer rate of packets from the computer. The predetermined action on the subsequent packets may be performed by the router 112 at the network layer, such as by extracting source IP addresses from IP packets and then comparing the source IP addresses to a blacklist, cache, or other local storage mechanism in the router containing a listing of IP addresses of spammers, for example.

In one embodiment, the computers shown in FIG. 1 communicate using the Open System Interconnect (OSI) reference model. As is well known, the OSI reference model uses what is referred to as the "OSI protocol stack." The OSI protocol stack has seven layers with the physical layer on layer 1, the data link layer on layer 2, the network layer on layer 3, the transport layer on layer 4, the session layer on layer 5, the presentation layer on layer 6, and the application layer on layer 7. In the OSI protocol stack, layer 1 is the lowest layer and layer 7 is the highest. Each higher layer packet is encapsulated by a lower layer packet. For example, a TCP packet (transport layer) is encapsulated by an IP packet (network layer). As will be more apparent below, embodiments of the present invention allow for blocking or data transfer rate limiting of packets from spammers at the network layer (layer 3 of the OSI reference model) in a router. As more computing resources are required to process higher layer packets, this advantageously allows for a faster, more efficient anti-spam solution.

FIGS. 3-6 show call diagrams in accordance with embodiments of the present invention. FIGS. 3-6 are explained using the computing environment of FIG. 1. The mail transfer agent 113 is operated by a spammer in the example of FIGS. 3-6.

Figure 3:
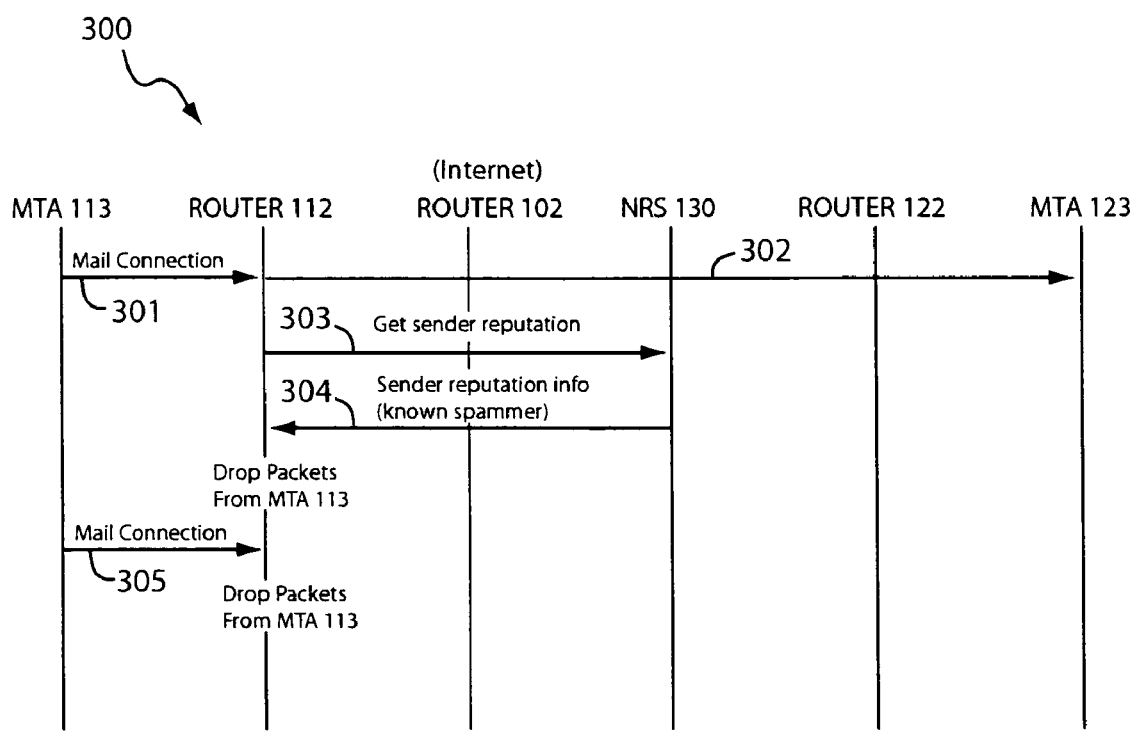
FIGS. 3-6 show call diagrams in accordance with embodiments of the present invention.

Referring first to FIG. 3, a call diagram 300 begins when the mail transfer agent (MTA) 113 initiates a mail connection (e.g., SMTP connection) to the mail transfer agent 123 (arrow 301). The packets of the mail connection are received by the router 112, which forwards the packets towards the mail transfer agent 123 (arrow 302). In call diagram 300, the router 112 allows the mail connection to go through while still determining if the mail transfer agent 113 is that of a spammer. The anti-spam module 114 in the router 112 listens to network traffic flowing through the router 112 and detects initial mail connection packets. The initial mail connection packets may comprise TCP (Transmission Control Protocol) handshake packets with a destination port reserved for e-mails (e.g., port number 25). For example, mail connection TCP handshake packets may be identified by a set SYN flag in the TCP header and destination port number 25.

Upon detection of initial mail connection packets, the anti-spam module 114 extracts the IP address of the mail transfer agent 113 from the IP header of the IP packet encapsulating the TCP handshake packet. The anti-spam module 114 may determine the reputation of the mail transfer agent 113 by forwarding the IP address of the mail transfer agent 113 to the network reputation service (NRS) 130 as part of a request for reputation information (arrow 303). The network reputation service 130 compares the IP address of the mail transfer agent 113 to a database of IP addresses of known spammers. In this example, the mail transfer agent 113 belongs to a spammer and matches an IP address in the database of the network reputation service 130. Accordingly, the network reputation service 130 informs the anti-spam module 114 that the mail transfer agent 113 belongs to a spammer (arrow 304). In response, the anti-spam module 114 stores the IP address of the mail transfer agent 113 in a blacklist. In one embodiment, the router 112 drops packets having a source IP address listed in a blacklist locally stored in the router 112. In this example, subsequent packets received from the mail transfer agent 113 are dropped silently (i.e. without informing the mail transfer agent 113) by the router 112 (arrow 305).

The blocking of subsequent packets from the mail transfer agent 113 may be performed by inspecting network layer packets of network traffic flowing through the router 112. In one embodiment, the router 112 extracts source IP addresses from the header of IP packets, and compares the extracted source IP addresses to those in the blacklist (e.g., in cache or some other local storage mechanism) to determine if a particular packet should be dropped. Doing this inspection at the network layer advantageously allows for more efficient and faster processing compared to doing the inspection at higher layers (e.g. application layer). Furthermore, looking for spammers at an ingress router (i.e., router before the Internet backbone) effectively cuts down on Internet traffic. This not only benefits Internet users in general, but also saves cost. For example, the private computer network 110 may belong to an Internet service provider that pays fee on a per traffic basis to another Internet service provider that operates the private computer network 120. By implementing an anti-spam solution in the router 112, the Internet service provider cuts down on fees resulting from activities caused by spammers operating from within its network. As can be appreciated, the anti-spam module 114 may also be implemented in the router 102 to cut down on Internet traffic from spammers.

In the call diagram 300, the anti-spam module 114 checks the reputation of the initiating mail transfer agent only during the initial mail connection. This advantageously limits the impact of anti-spam processing to the router. Also, note that anti-spam module 114 does not have to check the reputation of an initiating mail transfer agent that the anti-spam module 114 previously determined to be a spammer because that mail transfer agent's IP address would have been in the blacklist and thus immediately identified at the network layer as to be blocked.

Once the anti-spam module 114 identifies an IP address of a spammer, that IP address can be added to the blacklist of other routers by propagating this spammer information using BGP/IP or other router communication protocols. This allows other routers to look for and block packets from the same IP address.

Figure 4:
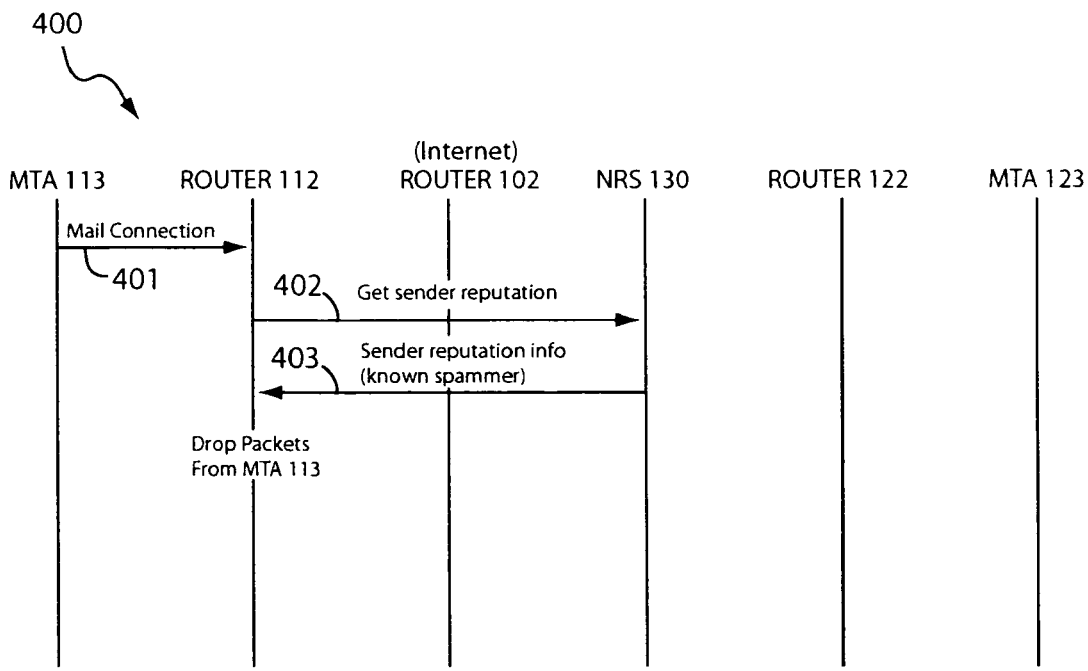

FIG. 4 shows a call diagram 400 in accordance with another embodiment of the present invention. The call diagram 400 is similar to the call diagram 300 except that the router 112 does not forward mail connection packets from mail transfer agents with unknown reputation. In the call diagram 400, the mail transfer agent 113 initiates a mail connection to the mail transfer agent 123 (arrow 401). The router 112 receives the initial mail connection packets from the mail transfer agent 113 but does not forward the packets. Instead, the router 112 holds the packets until it determines whether or not the mail transfer agent 113 is spamming. Accordingly, the anti-spam module 114 in the router 112 asks the network reputation service 130 for the reputation information of the mail transfer agent 113 (arrow 402). As before, the anti-spam module 114 may do so by sending the IP address of the mail transfer agent 113 to the network reputation service 130. The network reputation service 130 checks its database of known spammers, determines that the mail transfer agent 113 belongs to a spammer, and so informs the anti-spam module 114 in the router 112 (arrow 403). The anti-spam module 114 adds the IP address of the mail transfer agent 113 to its blacklist, allowing the router 112 to identify and drop all packets from the mail transfer agent 113. The next time the mail transfer agent 113 initiates a mail connection through the router 112, the router 112 can extract the IP address of the mail transfer agent 113 at the network layer to find that the mail transfer agent 113 is in the blacklist and accordingly must be blocked.

Figure 5:
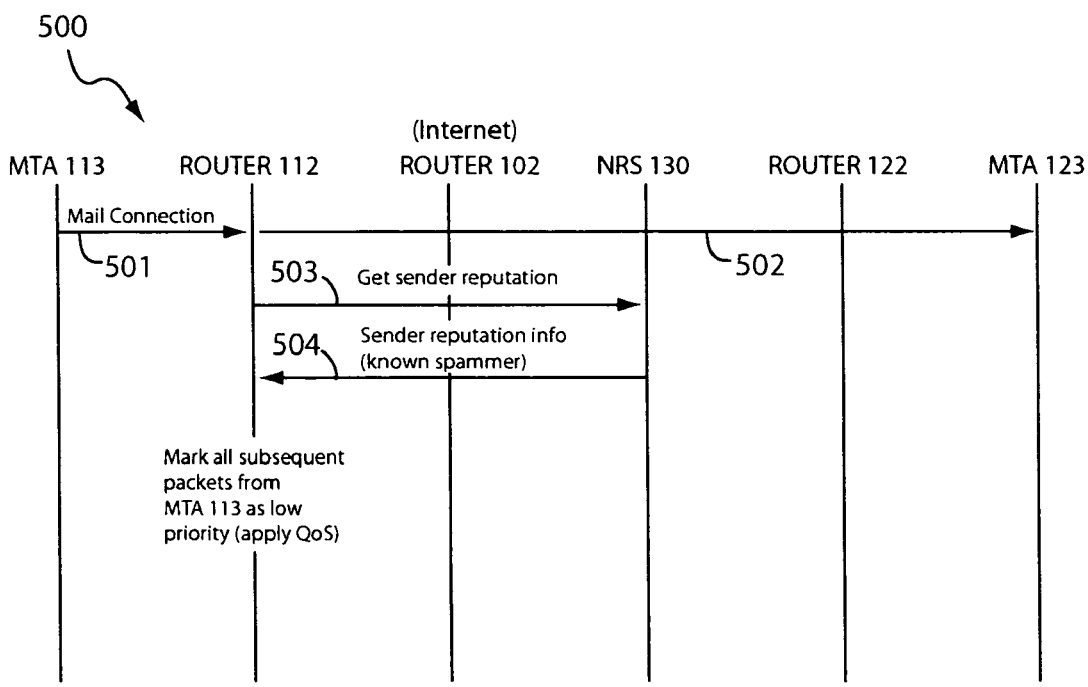

FIG. 5 shows a call diagram 500 in accordance with another embodiment of the present invention. The call diagram 500 is similar to the call diagram 300 except that the router 112 slows the data transfer rate of, rather than block completely, all packets from a spammer. In the call diagram 500, the mail transfer agent 113 initiates a mail connection to the mail transfer agent 123 (arrow 501). The router 112 receives the initial mail connection packets from the mail transfer agent 113 and forwards the packets towards the mail transfer agent 123 (arrow 502) while still determining if the mail transfer agent 113 is a spammer. The anti-spam module 114 in the router 112 listens to network traffic flowing through the router 112 and detects the initial mail connection packets. The anti-spam module 114 asks the network reputation service 130 for the reputation information of the mail transfer agent 113 (arrow 503) by, for example, sending the IP address of the mail transfer agent 113 to the network reputation service 130. The network reputation service 130 checks its database of known spammers, determines that the mail transfer agent 113 belongs to a spammer, and so informs the anti-spam module 114 in the router 112 (arrow 504). In response, the router 112 marks all subsequent packets from the mail transfer agent 113 as low priority. This slows down the data transfer rate through the router 112 of packets from the mail transfer agent 113. The router 112 may slow the data transfer rate of packets by assigning a low quality of service (QoS) to the packets. For example, the router 112 may modify the "type of service" field in the IP header of packets from the mail transfer agent 113 to a value that results in low priority. This effectively reduces the network bandwidth consumed by the mail transfer agent 113.

After the anti-spam module 114 identifies a mail transfer agent as belonging to a spammer, the anti-spam module 114 may add that mail transfer agent's IP address to a reduced rate list. The router 112 may check the reduced rate list to determine if a particular packet needs to be marked for reduced data transfer rate. The data transfer rate reduction may be performed by inspecting network layer packets of network traffic flowing through the router 112. In one embodiment, the router 112 extracts source IP addresses from the header of IP packets, and compares the extracted source IP addresses to those in the reduced rate list (or cache, or some other local storage mechanism) to determine if a particular packet should be marked as low priority. As mentioned, doing this inspection at the network layer advantageously allows for more efficient and faster processing compared to doing the inspection at higher layers (e.g. application layer).

Figure 6:
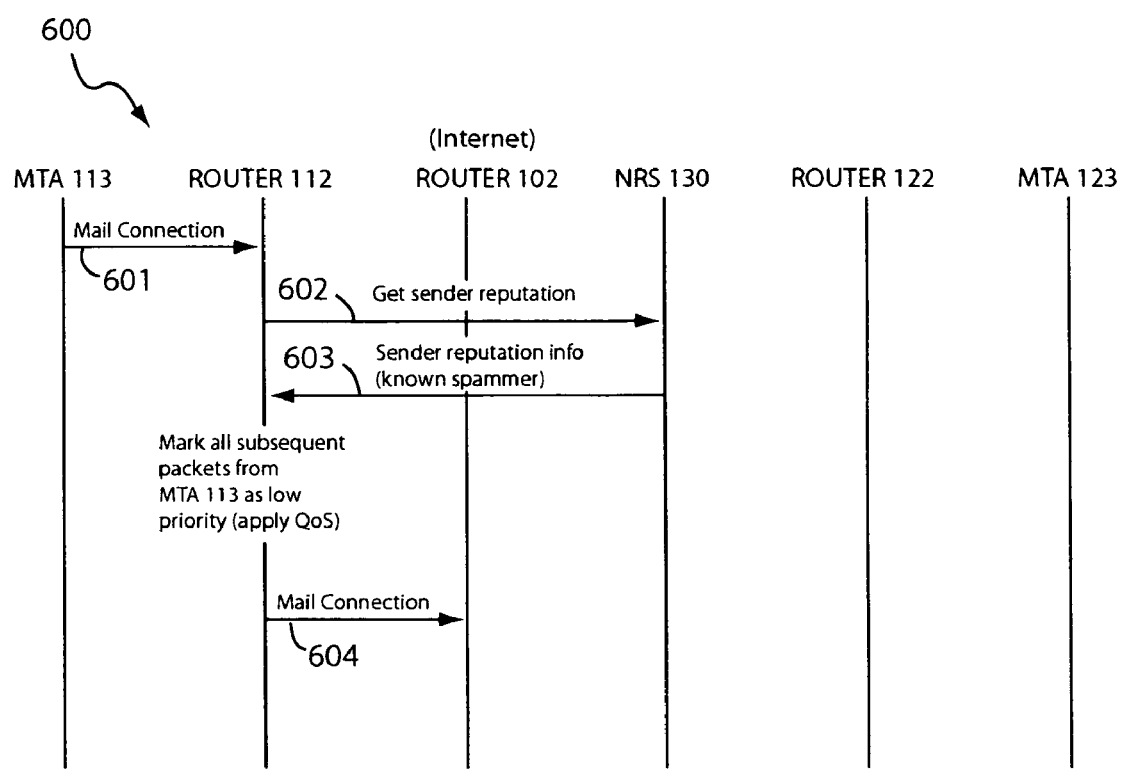

FIG. 6 shows a call diagram 600 in accordance with another embodiment of the present invention. The call diagram 600 is similar to the call diagram 500 except that the router 112 does not forward mail connection packets from mail transfer agents with unknown reputation. In the call diagram 600, the mail transfer agent 113 initiates a mail connection to the mail transfer agent 123 (arrow 601). The router 112 receives the initial mail connection packets from the mail transfer agent 113 but does not forward the packets. Instead, the router 112 holds the packets until it determines whether or not the mail transfer agent 113 is spamming. Accordingly, the anti-spam module 114 in the router 112 asks the network reputation service 130 for the reputation information of the mail transfer agent 113 (arrow 602). The anti-spam module 114 may do so by sending the IP address of the mail transfer agent 113 to the network reputation service 130. The network reputation service 130 checks its database of known spammers, determines that the mail transfer agent 113 belongs to a spammer, and so informs the anti-spam module 114 in the router 112 (arrow 603). In response, the router 112 marks received and subsequently received packets from the mail transfer agent 113 as low priority to slow down the data transfer rate through the router 112 of packets from the mail transfer agent 113. The router 112 forwards packets from the mail transfer agent 113 at some point (arrow 604) but at a relatively slow data transfer rate.

Figure 7:
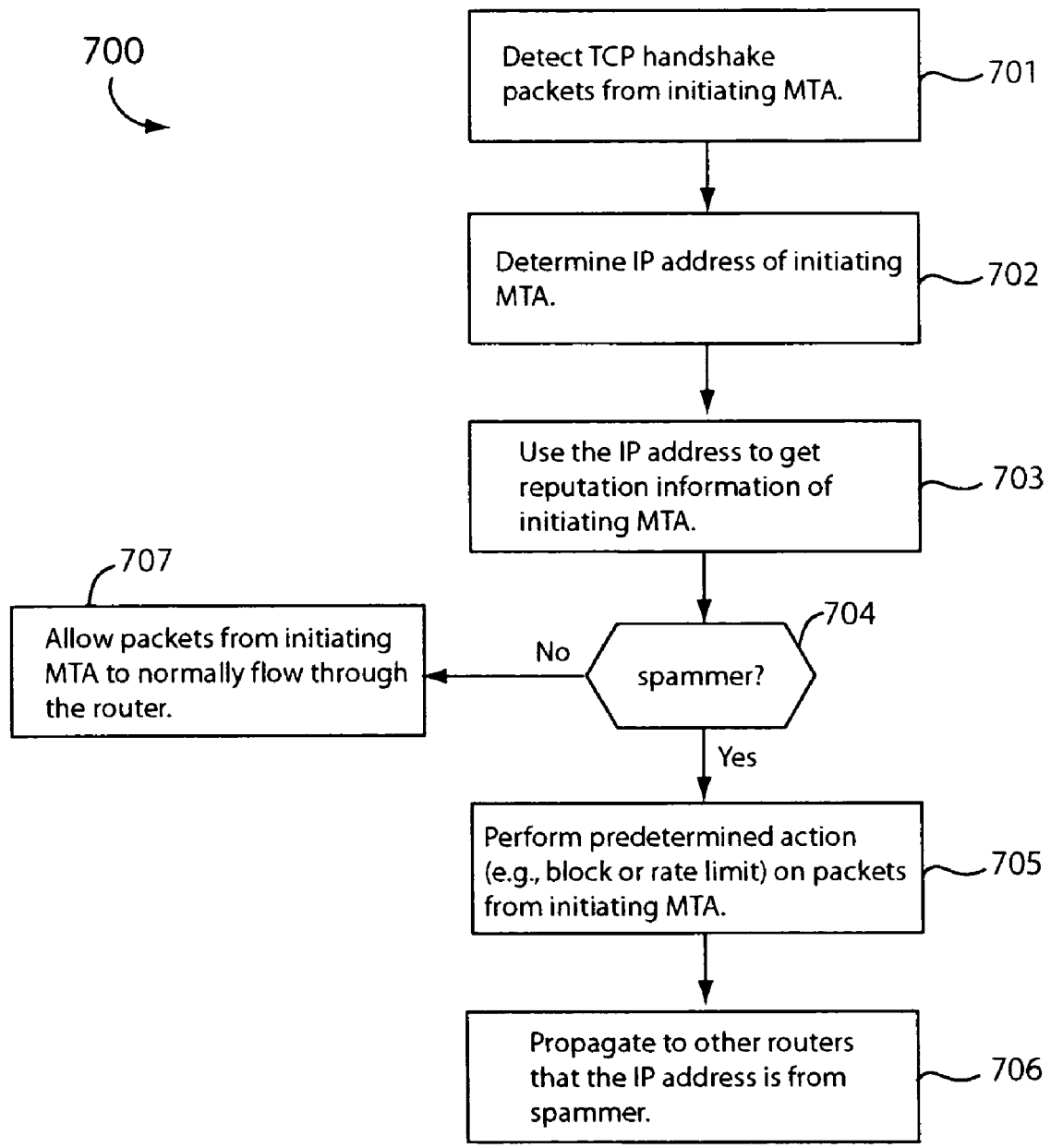
FIG. 7 shows a flow diagram of a method of performing anti-spam at a router in accordance with an embodiment of the present invention.

Referring now to FIG. 7, there is shown a flow diagram of a method 700 of performing anti-spam at a router in accordance with an embodiment of the present invention. The method 700 may be performed using the components shown in FIG. 1. Other components may also be used without detracting from the merits of the present invention.

In step the 701, the anti-spam module 114 in the router 112 detects TCP handshake packets from a mail transfer agent initiating a mail connection to another mail transfer agent through the router 112. The TCP handshake packets may be identified as those having a set SYN flag in the TCP header. Mail connection packets, such as those from the mail transfer agent, have a destination port number 25, for example.

In step 702, the anti-spam module 114 determines the IP address of the initiating mail transfer agent by, for example, extracting the IP address from the IP header of an IP packet encapsulating a TCP handshake packet.

In step 703, the anti-spam module 114 uses the extracted IP address to get the reputation information of the initiating mail transfer agent. For example, the anti-spam module 114 may send the extracted IP address to the network reputation service 130 as part of a request for reputation information. In response, the network reputation service 130 informs the anti-spam module 114 whether or not the extracted IP address belongs to a known spammer.

If the extracted IP address does not belong to a known spammer, the router 112 allows packets from the initiating mail transfer agent to normally pass through, as indicated by the method path from step 704 to step 707.

If the extracted IP address belongs to a known spammer, the router 112 performs a predetermined action on packets from the initiating mail transfer agent, as indicated by the method path from step 704 to step 705. The predetermined action may include blocking or limiting the data transfer rate of received or subsequently received packets from the initiating mail transfer agent. The blocking or limiting of the data transfer rate may be performed by inspecting at the network layer packets received in the router 112. For example, the router 112 may inspect IP packets for source IP addresses matching that of the initiating mail transfer agent to determine whether or not to perform the predetermined action on a particular IP packet. This packet inspection is preferably performed at layer 3 (network layer) of the OSI reference model.

In step 706, which is an optional step, the router 112 may propagate to other routers the information that the initiating mail transfer agent is operated by a spammer. For example, the router 112 may use BGP/RIP to propagate to other routers the information that the IP address belongs to a spammer and must therefore be blocked or rate limited.

While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of performing anti-spam in a router in a computer network, the method comprising:
   receiving in the router a TCP handshake packet from an initiating mail transfer agent, the TCP handshake packet being configured to initiate a connection with another mail transfer agent;
   detecting receipt of the TCP handshake packet in the router;
   determining an IP address of the initiating mail transfer agent;
   consulting an externally located network reputation service to determine if the IP address belongs to a known spammer;
   inspecting at a network layer a source IP address of an IP packet received in the router; and
   performing a predetermined action on the IP packet in the router when the source IP address is that of the initiating mail transfer agent and the mail transfer agent is deemed by the network reputation service as belonging to a known spammer, wherein the predetermined action includes marking the IP packet as low priority as part of slowing down a data transfer rate of all packets from the initiating mail transfer agent.

2. The method of claim 1 wherein the predetermined action includes dropping the IP packet.

3. The method of claim 1 wherein marking the IP packet as low priority comprises modifying a value of a type of service field in a header of the IP packet.

4. The method of claim 1 further comprising:
   propagating to other routers information that the initiating mail transfer agent sends spam when the mail transfer agent is deemed by the network reputation service as belonging to a known spammer.

5. The method of claim 1 wherein the router allows packets from the initiating mail transfer agent to go through while determining if the IP address belongs to a known spammer.

6. A method of performing anti-spam in a router in a computer network, the method comprising:
   detecting reception of network layer packets in the router;
   in the router, inspecting at a network layer source addresses of the network layer packets;
   comparing in the router the source addresses to addresses of computers employed by spammers; and
   in the router, performing a predetermined action on a particular network layer packet having a source address matching that of a computer employed by a spammer, wherein the predetermined action comprises marking the particular network layer packet as low priority to delay the routing of the particular network layer packet.

7. The method of claim 6 wherein detecting reception of the network layer packets in the router comprises:
   detecting TCP handshake packets having a set SYN flag and a destination port number 25.

8. The method of claim 6 wherein the router allows network layer packets to flow through the router while the router verifies whether or not any of the network layer packets is from a computer employed by a spammer.

9. The method of claim 6 wherein the router consults an externally located network reputation service to determine whether a source address belongs to a computer employed by a spammer.

10. The method of claim 6 wherein the router does not allow network layer packets to flow through the router without first determining whether or not the network layer packets are from computers employed by spammers.

11. The method of claim 6 wherein the predetermined action comprises dropping the particular network layer packet.

* * * * *